United States Patent Office 2,702,193
Patented Feb. 15, 1955

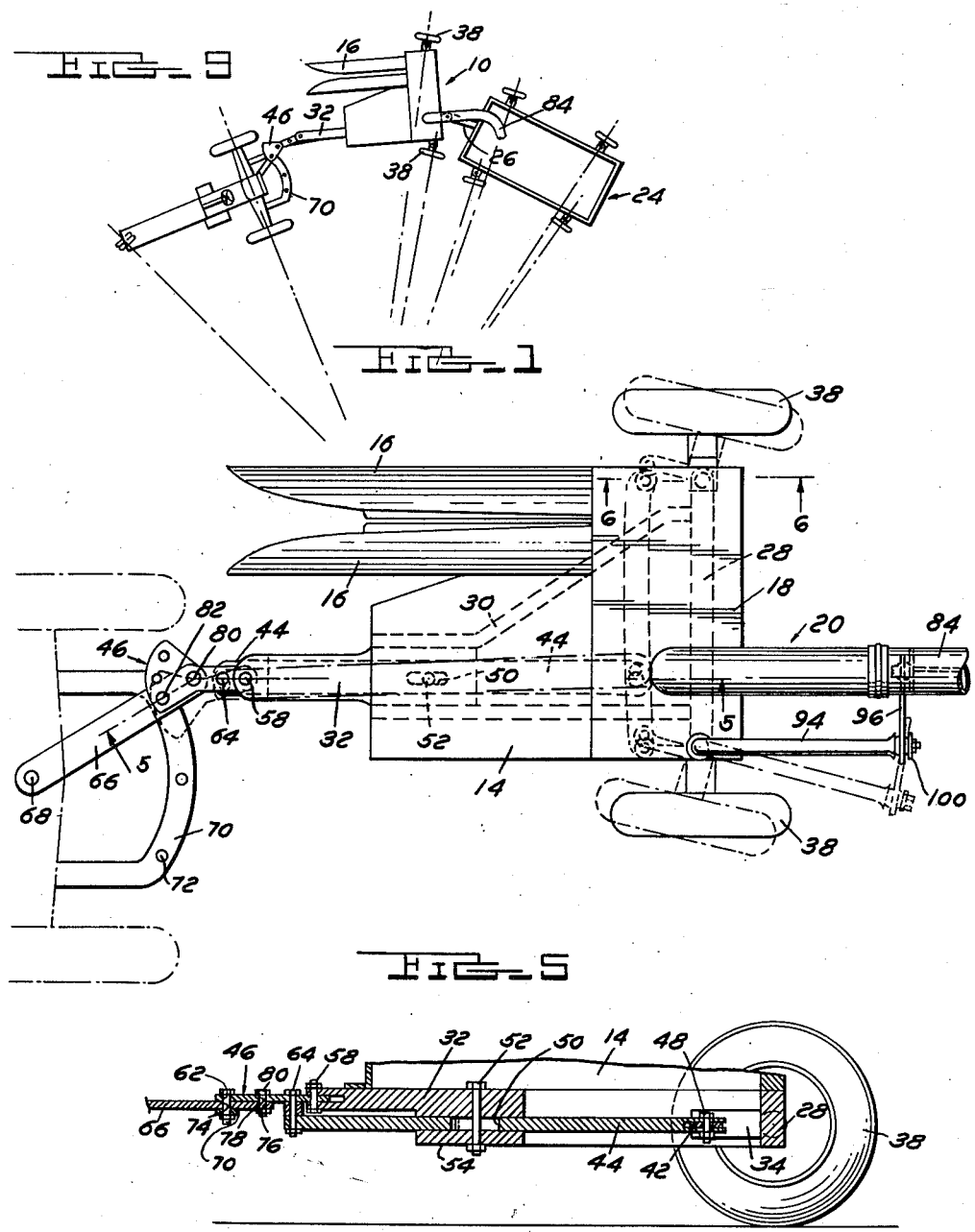

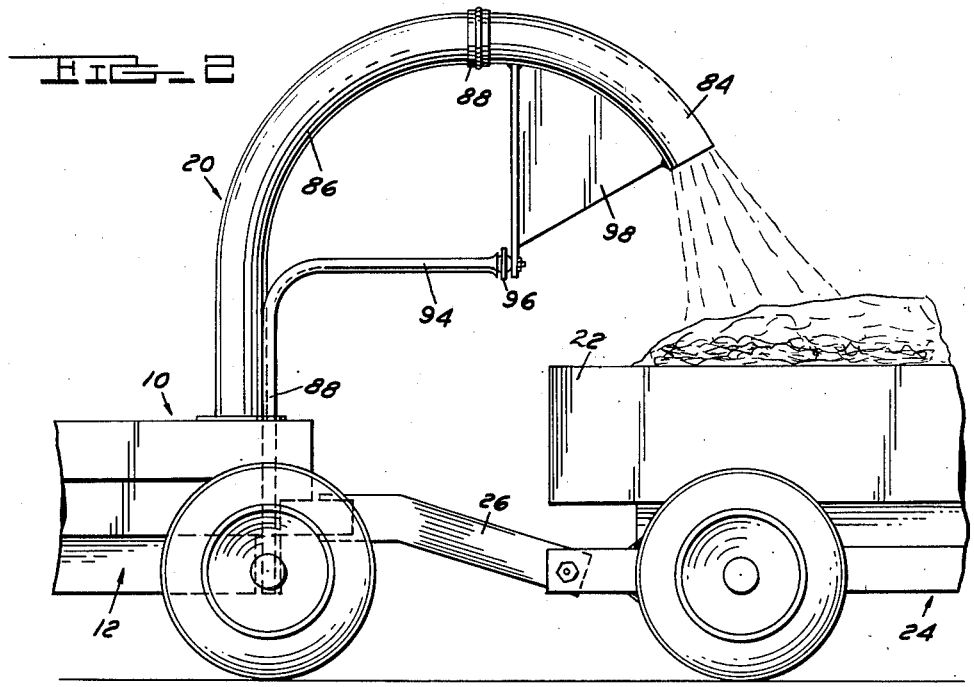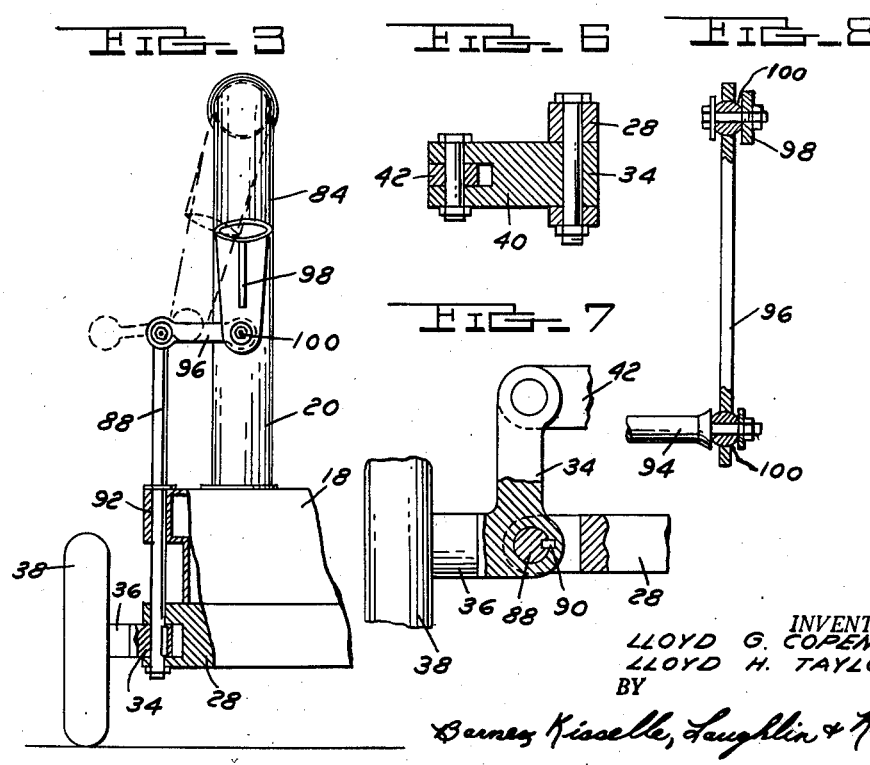

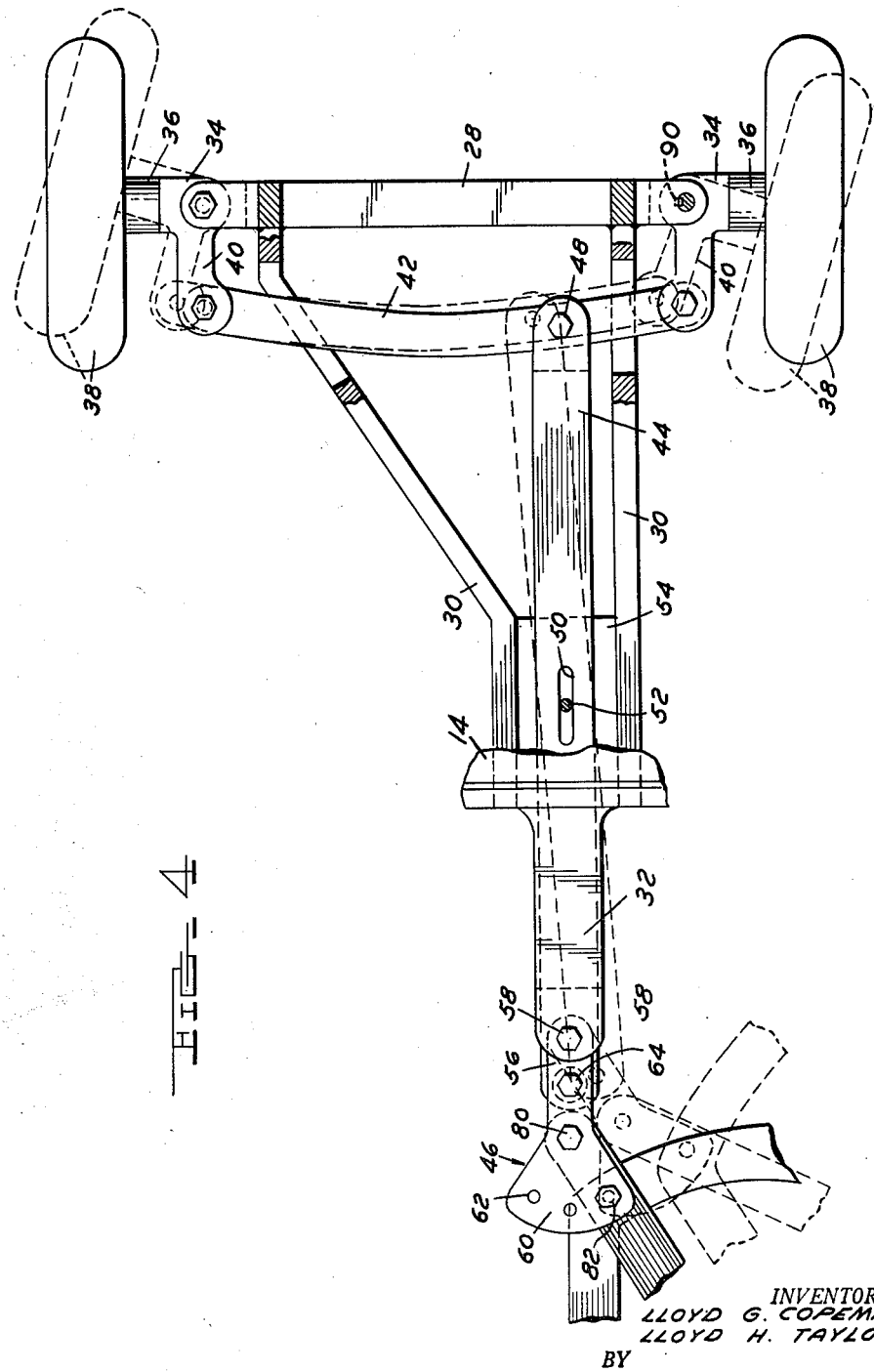

2,702,193

TWO-WHEEL STEERABLE VEHICLE

Lloyd H. Taylor and Lloyd G. Copeman, Metamora, Mich., assignors to Copeman Laboratories Company, Flint, Mich., a corporation of Michigan Application May 21, 1951, Serial No. 227,304

8 Claims. (Cl. 214—42)

This invention relates to a vehicle and, more particularly, to a steerable two-wheel vehicle which is particularly adapted for use as an agricultural implement.

More particularly, the invention relates to an agricultural implement such as a harvester provided with a discharge chute adapted to discharge the crop harvested and treated by the implement into a trailing wagon.

One of the difficulties with harvesters as conventionally constructed is that the discharge chute is more or less rigid on the harvesting implement; and hence, when the implement turns a corner, the chute swings wide of the trailing wagon and the material is discharged from the chute beyond the confines of the trailing wagon thus losing a considerable portion of the crop when an entire field is harvested.

This problem has been recognized in the art for many years and various solutions have heretofore been offered. In some harvesters the discharge chute is manually pivotable so that, as the implement turns a corner, the chute may be swung by the operator so as to continuously discharge the harvested crop into the trailing wagon. It has also been proposed to provide harvesters with means for cutting off the feed through the chute during the time when the implement is turning. Still another solution proposed resides in the provision of a chute arranged for a vertical hinging movement and connecting the chute by suitable link means with the trailing wagon so that the discharge end of the chute tends to remain disposed above the trailing wagon.

The present invention in its broad aspects, contemplates a two-wheel vehicle, the wheels being steerable so that the vehicle will accurately track the towing vehicle, that is, the towed vehicle will follow the same general arcuate path as the towing vehicle. In the case of agricultural implements, a two-wheel vehicle of this type is highly desirable. In harvesting and the like where the tractor is driven between regularly spaced rows, the harvesting implement is often offset laterally with respect to the tractor; and when the implement is provided with steerable wheels, it tracks the tractor around turns and thereby follows the desired rows rather than turning sharply and cutting short around corners.

Another object of the invention resides in the provision of a novel draft tongue arrangement for a two-wheel vehicle which is rigid, economical to manufacture, and which permits hitching the vehicle to a towing vehicle in a plurality of different positions, either aligned or offset from the central longitudinal axis of the tractor.

In the drawings:

Fig. 1 is a top elevation of a harvester embodying the present invention and hitched to a tractor.

Fig. 2 is a fragmentary side elevation of the harvester and showing a trailing wagon hitched thereto.

Fig. 3 is a fragmentary rear view of the harvester, partly in section.

Fig. 4 is a top view of the harvester with the platform which supports the operating mechanism removed therefrom.

Fig. 5 is a sectional view along the lines 5—5 in Fig. 1.

Fig. 6 is a sectional view along the lines 6—6 in Fig. 1.

Fig. 7 is a detail sectional view of the connection between the discharge chute and the steering mechanism for the implement.

Fig. 8 is a detail view, partly in section, of the linkage arrangement between the discharge chute and the steering mechanism for the implement.

Fig. 9 is a diagrammatic view showing the general arrangement of a tractor towing a harvester embodying this invention and a trailing wagon having four steerable wheels.

The present invention is admirably suited for agricultural implements and particularly to harvesters. For the purposes of illustration, the invention is therefore shown and described with reference to a harvester; but it will be appreciated, as the description proceeds, that the invention is applicable to two-wheel vehicles in general and is not restricted to any particular type of vehicle.

In the drawings, there is illustrated a harvester 10 having a frame 12 supporting a platform 14 on which is arranged a pair of scoops 16 which gather the crop being harvested and convey it to a processing apparatus 18, such as choppers or the like, the processed crop thereafter being blown through a chute 20 into the box 22 of the trailing wagon 24 pivotally connected to the implement 10 as by a hitch 26. The specific construction of harvester 10, particularly with reference to the gathering scoops 16 and the processing mechanism 18, forms no part of the present invention; and the harvester has therefore been shown more or less diagrammatically with respect to these features.

Referring more particularly now to Figs. 4, 5, 6 and 7, the steering mechanism of the vehicle is there illustrated. The frame 12 includes a rigid axle 28 to which is rigidly connected, as by welding, a pair of forwardly extending frame members 30, one of said members being angularly shaped so that the draft tongue support 32 of the vehicle, which is rigidly connected to the frame members 30, is offset with respect to the central longitudinal axis of the vehicle. The draft tongue support 32, the frame members 30, and the axle 28 comprise a rigid frame unit on which the platform 14 may be supported.

At each of its opposite ends there is pivotally supported on axle 28 a conventional steering knuckle 34 provided with a stub axle 36 on which the wheels 38 are journalled. As is illustrated in Figs. 6 and 7, steering knuckles 34 are connected with axle 28 for pivotal movement thereon about substantially vertical axes. Each of the steering knuckles is provided with a forwardly extending arm 40, the arms being connected for turning movement in unison by a tie rod 42. It will be observed that, when tie rod 42 is shifted laterally towards one side of the vehicle, the wheels are turned in one direction; and when it is shifted laterally towards the other side of the vehicle, the wheels are turned in the opposite direction.

Steering of wheels 38 is effected by means of a longitudinally extending lever 44 and the implement draft tongue 46. Lever 44 is pivotally connected at its rear end as by a pin 48 with tie rod 42. At the central portion thereof lever 44 is fashioned with a longitudinal slot 50 through which extends a pin 52. Pin 52 is rigidly supported on frame 12 by the draft tongue support 32 and a bottom plate 54. Plate 54 is rigidly secured to frame members 30 and is spaced below tongue support 32 so that lever 44 is slidably supported therebetween (see Fig. 5). Draft tongue 46 has an axially extending portion 56 which is pivotally connected to the front end of support 32 as by a nut and bolt 58. At its forward end draft tongue 46 is provided with an integral fan-shaped portion 60 having a plurality of circumferentially spaced openings 62 therein. Lever 44 extends forwardly beneath support 32 and at its front end is pivotally connected with draft tongue 46 as by a nut and bolt 64.

It will be observed that draft tongue 46 is swingable in a generally horizontal plane about its pivotal connection at 58. When the draft tongue 46 is pivoted to the dotted line position shown in Fig. 4, lever 44, by reason of its pivotal connection with the draft tongue 46, is also thereby pivoted to the dotted line position shown in Fig. 4. Since draft tongue 46 pivots about bolt 58 as a center, it will be noted that the pivotal connection 64 between the draft tongue and lever 44 also swings about bolt 58 as a center. This being the case, it will be observed that lever 44 not only pivots about pin 52 but is also shifted rearwardly a slight extent. At its rear end lever 44 thereby shifts tie rod 42 from the position shown in full lines to the position shown in broken lines, the pivotal connection 48 being shifted laterally and in a direction rearwardly of the vehicle.

The general arrangement of the longitudinally shiftable lever 44 is shown in connection with a trailer having four steerable wheels in our copending application Serial No. 208,686, filed January 31, 1951. The principle of the steering mechanism disposed herein is generally the same as that disclosed in our said copending application. By providing fixed pivotal connections at the front and rear ends of lever 44 and a sliding pivotal connection with the frame at the central portion of lever 44, we have discovered that a minimum of force is required to be exerted on draft tongue 46 in order to turn wheels 38.

Referring more particularly now to Fig. 1 the arrangement for attaching the implement to a tractor is there illustrated. The tractor is preferably provided with a straight drawbar 66 pivoted, as at 68, for swinging in a horizontal plane. The tractor is also provided with a rigidly mounted, arcuately shaped drawbar 70 provided with a plurality of spaced openings 72. Drawbar 66 is provided with an opening 74 which is arranged to coincide with the openings 72 on drawbar 70 when the drawbar 66 is swung about its pivotal connection 68. Drawbar 66 is also provided with a second opening 76 at the free end thereof. Draft tongue 46 is fashioned with a central opening 78, the openings 78 and 62 being spaced to correspond with openings 74 and 76 on drawbar 66 so that, when the drawbar 66 is swung to a position in alignment with one of the holes 72, draft tongue 46 can be supported at the end of drawbar 66 and coupling pins 80 and 82 may be inserted through the juxtaposed openings.

It will be observed that wheels 38 are straight when the pivotal connections 58, 64 and 80 are aligned in a straight line. Openings 62 on draft tongue 46 and openings 72 on drawbar 70 are therefore correspondingly spaced apart so that each opening on draft tongue 46 corresponds to a particular opening on drawbar 70. In other words, when the implement is hitched to the tractor at any of the openings 72 and driven in a straight path, wheels 38 follow in a straight path. The fan-shaped portion 60 of drawbar 66 thereby enables hitching the steerable wheel implement to the tractor in a position offset to either one side or the other or in a position with the draft tongue aligned centrally with the tractor.

Referring now to Figs. 1, 2 and 3, it will be noted that chute 20 has a discharge portion 84 which is swivelly mounted on a rigid portion 86 of the chute. The swivel connection 88 is preferably arranged such that the discharge portion 84 swivels about a horizontal axis. The discharge portion 84 is arranged to be swiveled or turned in response to turning of wheels 38. The means for accomplishing this may be of any suitable form. For the purposes of illustration, these means are shown in the form of a vertically extending shaft 88 the lower end of which is keyed, as at 90, to one of the steering knuckles 34 and provides the pivotal connection between the steering knuckles 34 and axle 28. A bearing 92 on the implement supports shaft 88 for turning on a vertical axis with knuckle 34. The upper portion of the shaft 88 is fashioned with a rearwardly extending horizontal portion 94 which swings in a horizontal plane when shaft 88 turns about its vertical axis. A link 96 connects the outer end of the portion 94 of shaft 88 with a depending reinforcing web 98 on the discharge portion 84 of chute 20. Link 96 is connected with portion 94 and web 98 by ball and socket joints 100.

It will be observed that, as the steering knuckle 34 turns, shaft 88 turns with it so as to swing the portion 94 thereof horizontally. Link 96 thereby swivels the chute portion 84 about swivel connection 88 to an extent in proportion to the extent of turning of knuckle 34. Hence, as the wheels 38 are turned from the solid to the broken line position, the chute portion 84 is correspondingly swiveled from the solid to the broken line position.

The desirability and advantages of an implement constructed in accordance with this invention can be more readily appreciated from the diagrammatic showing in Fig. 9. In this showing it will be seen that the implement 10 is connected with the tractor at one end of the arcuate drawbar 70 and that the trailing wagon 24 is hitched to the rear end of the implement 10. Wagon 24 is preferably of the type described in our said copending application and provided with four steerable wheels. In the arrangement illustrated, it will be noted that, when the tractor negotiates a turn, the wheels of the tractor as well as the wheels of the implement 10 and the trailing wagon 24 are all tangent to concentric circles. In other words, each of the vehicles will travel the same general path. The implement 10 and the wagon 24 will not tend to cut corners as would be the case if the wheels on the implement 10 and the rear wheels on the wagon 24 were not of the steerable type. Furthermore, it will be noted that, as the wheels negotiate a turn, the discharge end portion 84 of chute 20 swings in response to turning of the wheels on implement 10 to the position shown in solid lines so that the material being harvested and processed is directed continuously to approximately the center of the trailing wagon. In other words, the steering mechanism on implement 10 tends to maintain the discharge end of chute 20 in a more or less fixed position relative to wagon 24.

Thus, it will be seen that we have provided a highly desirable steering arrangement for a two-wheel vehicle. The steering arrangement of our invention enables the vehicle to accurately track the towing vehicle and is particularly adapted for farm implements where it is desired that both the tractor and the towing implement travel between well-defined rows of crops. More specifically, the structure is admirably adapted for harvesters, since it provides a convenient means for controlling the angular position of the discharge chute on the harvester so that the material being processed will be continuously directed into the trailing wagon even when the tractor and the implement are negotiating a turn in a field being harvested.

We claim:

1. In a two-wheel vehicle, the combination of means interconnecting the two wheels for turning in unison, a draft tongue pivotally connected with the vehicle and extending forwardly therefrom, a lever extending longitudinally of the vehicle and having fixed pivotal connections with said draft tongue and said means interconnecting said wheels at its front and rear ends, respectively, and having a sliding pivotal connection with the vehicle intermediate said fixed pivotal connections.

2. In a two-wheel vehicle, the combination of means interconnecting said wheels for turning in unison, a draft tongue pivotally connected with the vehicle and extending forwardly therefrom, a lever extending longitudinally of the vehicle and having fixed pivotal connections with said draft tongue and said means interconnecting said wheels at its front and rear ends, respectively, and having a sliding pivotal connection with the vehicle intermediate said fixed pivotal connections, said draft tongue being fan-shaped at its extreme forward end and being provided with a plurality of openings spaced across said fan-shaped end.

3. The combination set forth in claim 2 wherein said draft tongue is provided with another opening spaced intermediate said plurality of openings and the pivotal connection between the draft tongue and said lever.

4. In a vehicle, the combination of a pair of wheels, a tie rod extending between and connecting said wheels for turning in unison, a lever pivotally connected with said tie rod and extending forwardly therefrom, said lever having a sliding pivotal connection with said vehicle at a point spaced forwardly of said first mentioned pivotal connection, said vehicle also having means for pivotally supporting a draft tongue, and means adjacent the front end of said lever for pivotally connecting said lever with a draft tongue pivotally supported by the vehicle.

5. The combination set forth in claim 4 wherein the means at the front end of said lever for pivotal connection with a draft tongue are spaced forwardly of the means on said vehicle for pivotally supporting said draft tongue.

6. The combination set forth in claim 5 wherein the sliding pivotal connection between said lever and said vehicle enables the lever to shift longitudinally of the vehicle.

7. In a vehicle, the combination of a frame, a pair of wheels supported on said frame for turning about spaced vertical axes at each side of the vehicle, a tie rod interconnecting said wheels for turning in unison, a draft tongue pivotally supported on the forward end of said frame and extending forwardly therefrom, a lever extending longitudinally of said frame and having a pivotal connection with said tie rod at its rear end and with said draft tongue at its front end, said lever also having a pivotal connection with said frame intermediate its pivotal connections with said tie rod and said draft tongue, said draft tongue being provided adjacent its forward end with a centrally disposed opening therethrough and being also provided with a plurality of additional openings spaced circumferentially of said central opening.

8. A vehicle as called for in claim 1 including a chute on said vehicle having a discharge end portion overhanging the rear end of the vehicle and adapted for delivering material to a trailing vehicle connected with the two-wheel vehicle, said discharge end portion of the chute being pivotally supported on said two-wheel vehicle for lateral swinging movement and means interconnecting said discharge end portion of the chute with at least one of said steerable wheels for causing said discharge end portion of the chute to swing laterally in response to turning of said wheels whereby said discharge end portion remains in a position for discharging into said trailing vehicle when the two-wheel vehicle negotiates a turn.

References Cited in the file of this patent

UNITED STATES PATENTS

| | | |
|---|---|---|
| 1,133,838 | Clarke | Mar. 30, 1915 |
| 1,612,589 | Laird | Dec. 28, 1926 |
| 1,797,660 | Hughes | Mar. 24, 1931 |
| 2,028,221 | Klessig | Jan. 21, 1936 |
| 2,174,136 | Patty | Sept. 26, 1939 |
| 2,357,761 | Peacock | Sept. 5, 1944 |
| 2,491,353 | Acton | Dec. 13, 1949 |